US006792017B2

United States Patent
Halpin

(10) Patent No.: US 6,792,017 B2
(45) Date of Patent: Sep. 14, 2004

(54) HIGH ENERGY LASER BEAM DUMP

(75) Inventor: John Halpin, Tracy, CA (US)

(73) Assignee: The Regents of the University of California, Oakland, CA (US)

( * ) Notice: Subject to any disclaimer, the term of this patent is extended or adjusted under 35 U.S.C. 154(b) by 61 days.

(21) Appl. No.: 10/256,339

(22) Filed: Sep. 26, 2002

(65) Prior Publication Data

US 2004/0065646 A1 Apr. 8, 2004

(51) Int. Cl.[7] .................... H01S 3/04; B23K 27/00; B23K 26/06
(52) U.S. Cl. ..................... 372/35; 372/34; 372/36; 219/121.6; 219/121.61
(58) Field of Search .................. 372/34, 35, 36, 372/73, 103, 108; 219/121.6, 121.61

(56) References Cited

U.S. PATENT DOCUMENTS

| 3,638,140 A | * | 1/1972 | Knapp et al. .................. 372/34 |
| 4,747,673 A | | 5/1988 | Marrs et al. |
| 4,864,098 A | | 9/1989 | Basanese et al. |
| 4,865,446 A | | 9/1989 | Inoue et al. |
| 5,050,991 A | | 9/1991 | Welch |
| 5,073,831 A | | 12/1991 | Flint |
| 5,209,291 A | | 5/1993 | Taylor |
| 5,396,368 A | | 3/1995 | Khoshnevisan et al. |
| 5,508,235 A | * | 4/1996 | Marker .......................... 501/7 |
| 5,631,767 A | | 5/1997 | Dodge et al. |
| 5,718,979 A | | 2/1998 | Marker et al. |
| 5,793,012 A | * | 8/1998 | Ortiz, Jr. ................. 219/121.6 |
| 5,901,167 A | | 5/1999 | Sukhman et al. |

FOREIGN PATENT DOCUMENTS

EP    1 143 779 A1    10/2001

* cited by examiner

Primary Examiner—Don Wong
Assistant Examiner—Armando Rodriguez
(74) Attorney, Agent, or Firm—Eddie E. Scott; Alan H. Thompson

(57) ABSTRACT

The laser beam dump is positioned in a housing. An absorbing glass plate means is operatively connected to the housing. A heat sync means for extracting heat from the absorbing glass plate means is operatively connected to the housing and operatively connected to the absorbing glass plate means.

24 Claims, 4 Drawing Sheets

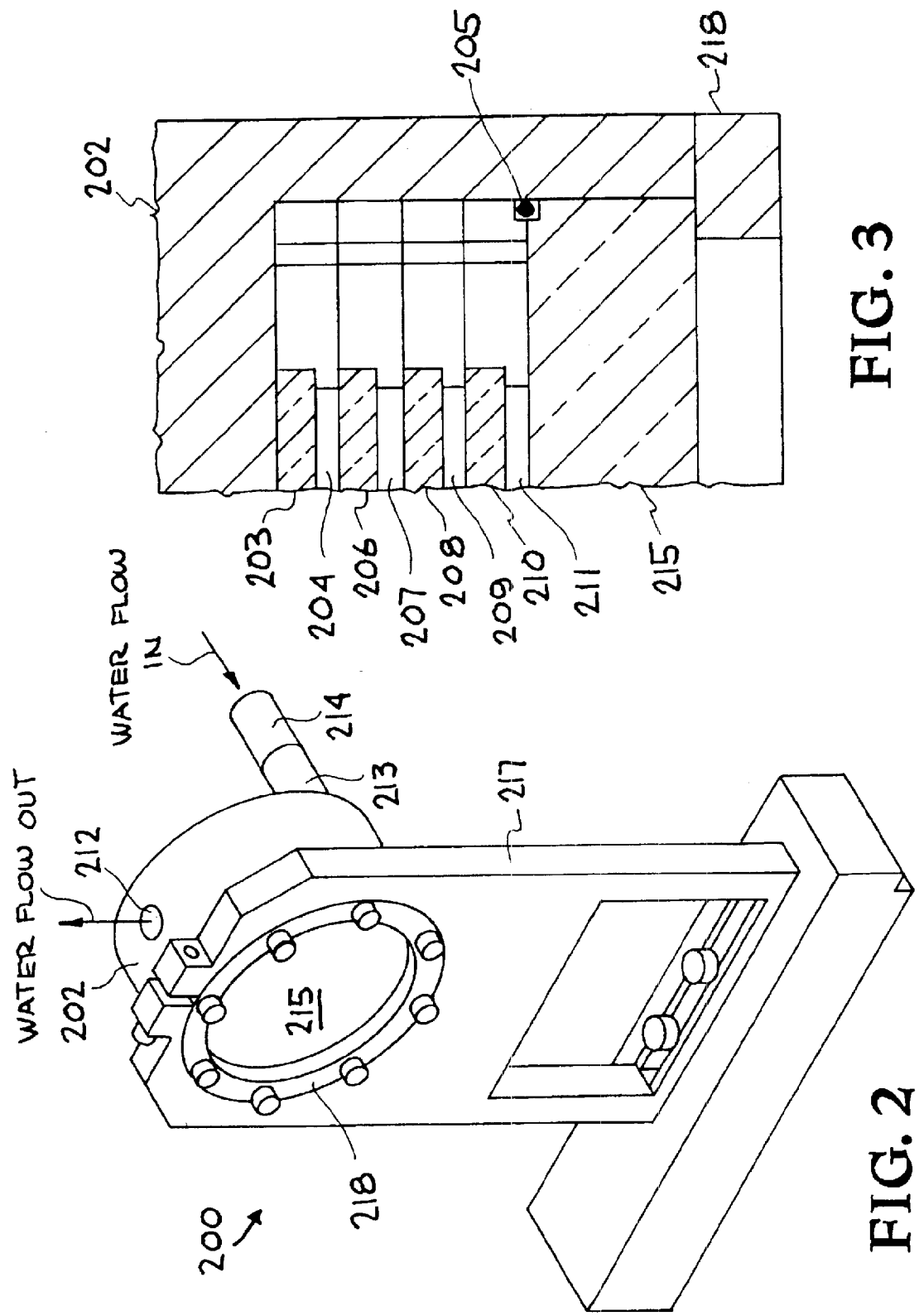

HIGH ENERGY LASER BEAM DUMP

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to laser and more particularly to a laser beam dump.

2. State of Technology

U.S. Pat. No. 4,864,098 for a high powered beam dump to Robert E. Basanese, et al. issued Sep. 5, 1989 provides the following information, "High power lasers, such as, for example, carbon dioxide lasers, are used for cutting and performing other operations on workpieces. The high power laser and workpiece must be carefully aligned to obtain the desired accuracy of the operation to be performed on the workpiece. During the time that the workpiece and laser are being aligned, the high power laser beam must be shuttered off from contact with the workpiece. The power of the laser beam must therefore be absorbed without damaging the shuttering-off apparatus. Typically, in previous laser shuttering techniques, a mirror has been placed in front of the beam to deflect the beam into an area away from the workpiece and outside of the beam path of the laser during realignment."

U.S. Pat. No. 5,793,012 for fresnel reflection termination system for high powered laser systems to Angel Luis Ortiz, Jr. issued Aug. 11, 1998 provides the following information, "Within high powered laser beams (systems of 0.1 kW and above), Fresnel reflections become a problem. This is especially true for laser systems that incorporate optical fiber injection. Such Fresnel reflections have an extremely high frequency, and enough power to burn materials such as plastics, paper, wire, insulation, etc. Typical power levels from Fresnel reflections range in the order of 4% of the main incident power or 80 Watts for a 2 kW beams and up to 240 Watts for a 6 kW beam. These reflections can cause serious damage to the surrounding hardware and environment if they are not captured and appropriately terminated. Accordingly, there is a need for an improved high power laser system which would terminate Fresnel reflections thereby preventing costly damage to the environment or hardware surrounding the laser system."

U.S. Pat. No. 5,631,767 for method and apparatus for laser beam management to Timothy J. Dodge issued May 20, 1997 provides the following information, "Working with such an "invisible" laser beam presents problems both at low and high power levels. First, at any power level, the exact location of a laser beam generally must be known at almost all times. The beam's location with respect to the object that it may be intended to strike is often critical to the process, experiment, or technique being carried out. More importantly, at high power levels, stray beams can cause serious damage to persons and equipment. For example, when dealing with high powered infrared lasers, a reflected beam with as little as 3% or 4% of the original power of the beam is still capable of burning many common objects, and causing serious bodily harm to persons. Accordingly, lower power invisible beams must be identified, and higher power beams must be both located and controlled ("managed") in some fashion that prevents them from damaging surrounding objects and persons. One aspect of such management is referred to as "dumping" a laser beam and the apparatus used to carry it out is also referred to as a "laser dump" or a "beam dump." The theoretical goal of a beam dump is to absorb the laser light and its associated power and transfer or convert it into another more manageable and less hazardous form."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a laser beam dump. The laser beam dump is positioned in a housing. An absorbing glass plate means is operatively connected to the housing. A heat sync means for extracting heat from the absorbing glass plate means is operatively connected to the housing and operatively connected to the absorbing glass plate means. In one embodiment, a first absorbing glass plate is operatively connected to the housing, a first heat sync to extract heat from the first absorbing glass plate is operatively connected to the housing and operatively connected to the first absorbing glass plate, at least one additional absorbing glass plate is operatively connected to the housing, and at least one additional heat sync to extract heat from the at least one additional absorbing glass plate is operatively connected to the housing and operatively connected to the at least one additional absorbing glass plate.

The laser beam dump provides a method of controlling a laser beam. The method includes the steps of directing a laser beam into an absorbing glass plate and extracting heat from the absorbing glass plate. In one embodiment the method comprises the steps of directing a laser beam into a first absorbing glass plate, extracting heat from the first absorbing glass plate, directing the laser beam into at least one additional absorbing glass plate, and extracting heat from the at least one additional absorbing glass plate. In one embodiment the first heat sync to extract heat from the first absorbing glass plate is a fluid. The fluid in one embodiment is water. In one embodiment the first heat sync to extract heat from the first absorbing glass plate is a heat sync material. In one embodiment a circulating fluid is used as the first heat sync and as the at least one additional heat sync.

In one embodiment the system is used as a power meter. A first temperature probe is positioned in the circulating fluid at the at least one additional heat sync, a second temperature probe is positioned in the circulating fluid at the first heat sync, and a flow meter is positioned in the circulating fluid. The temperature of the circulating fluid proximate the at least one additional heat sync and the temperature of the circulating fluid proximate the first absorbing glass plate are compared. The flow rate of the circulating fluid is measured using a flow meter. The temperature difference and the flow rate are used to calculate the total laser energy deposited.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 2 illustrates another embodiment of a laser beam dump system constructed in accordance with the present invention.

FIG. 3 is a cut away view of the housing shown in FIG. 2.

DETAILED DESCRIPTION OF THE INVENTION

Figure 1:
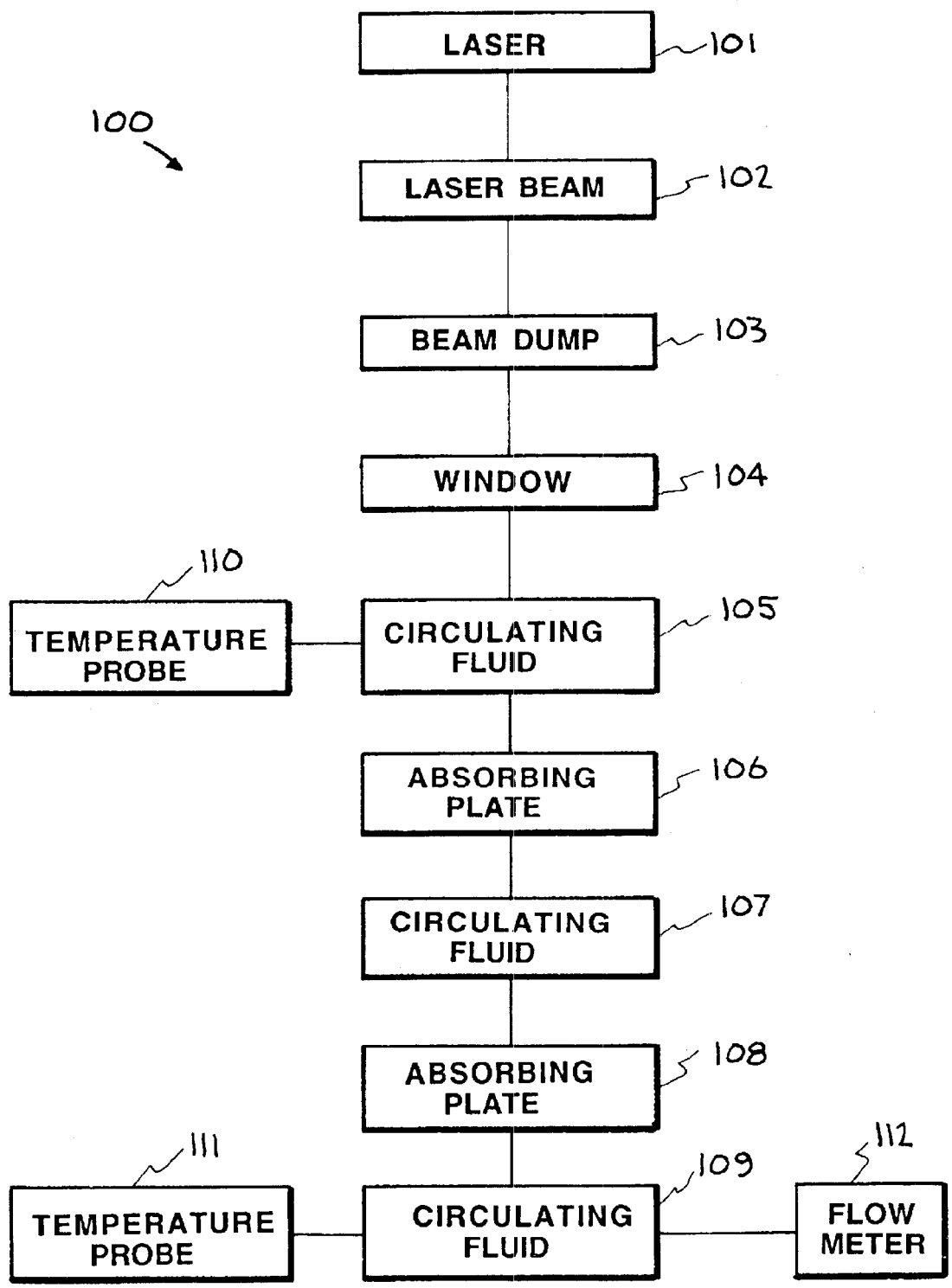
FIG. 1 illustrates one embodiment of a laser beam dump system constructed in accordance with the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1, one embodiment of a laser beam dump system constructed in accordance with the present invention is illustrated. This embodiment of a laser beam dump system is designated generally by the reference numeral 100. The system 100 incorporates a series of absorbing glass plates with a fluid flowing between them. A laser 101 produces laser beam 102. The laser beam 102 is directed into a beam dump 103. The beam dump utilizes a housing with a series of absorbing glass plates with a fluid flowing between them. A window 104 used to contain the heat sync fluid 105. A first absorbing glass plate 106 is operatively connected to the housing. A first heat sync 107 in the form of a circulating fluid is used to extract heat from the first absorbing glass plate 106. The circulating fluid also extracts heat from the window 104. An additional absorbing glass plate 108 is operatively connected to the housing. An additional heat sync 109 in the form of a circulating fluid is used to extract heat from the additional absorbing glass plate 108. It is understood that the laser beam 102 can continue into additional absorbing glass plates and heat can be extracted from the additional absorbing glass plates using a circulating fluid.

The system illustrated in FIG. 1 provides a method of controlling a laser beam. The laser 101 produces laser beam 102. The laser beam 102 is directed through the window 104. Heat is extracted from a first absorbing glass plate 106 using a circulating fluid 105. The circulating fluid also extracts heat from the window 104. The laser beam 102 continues into a second absorbing glass plate 108. Heat is extracted from the second absorbing glass plate 108 using a circulating fluid 109. It is understood that the laser beam 102 can continue into additional absorbing glass plates and heat can be extracted from the additional absorbing glass plates using a circulating fluid.

The system 100 can be used as a power meter by the installation of two temperature probes 110 and 111. The temperature probe 111 is placed in the inlet water channel and the temperature probe 110 is placed in the outlet. A flow measuring device 112 measures water flow. The differential water temperature combined with the flow rate is used to calculate the total laser energy deposited into the system 100, minus the Fresnel reflection. The system 100 can also be incorporated into an output safety shutter to safely control laser output energy.

Referring now to FIGS. 2 and 3, another embodiment of a laser beam dump system constructed in accordance with the present invention is illustrated. This embodiment of a laser beam dump system is designated generally by the reference numeral 200. A laser beam is directed into a beam dump 200, which is illustrated pictorially in FIG. 2. Controlling the output of a high energy, short pulse, laser can be difficult. The absorption of the laser output at the surface of traditional beam dump materials, such as metal, can generate a high temperature, plasma that will damage the dump surface and reflect energy back into the laser.

The beam dump 200 utilizes housing 202 with a series of absorbing glass plates with water flowing between them. Because the laser pulse is absorbed gradually by the glass over its thickness, the energy density at any one point is below the threshold for plasma generation. The laser light is converted to heat, which is removed gradually through a series of absorbing glass plates with water flowing between them. It is understood that instead of water a gas can also be used as the circulating heat sync.

A laser beam is directed through the window 215. The window 215 forms part of the housing 202. The window 215 and housing 202 are retained by a frame 217 and a bracket 218. As shown in FIG. 3, the housing contains from a first absorbing glass plate 210, a second absorbing glass plate 208, a third absorbing glass plate 206, and an additional absorbing glass plate 203. Channels 211, 207, 209, and 204 are located between the glass absorbing plates.

The circulating fluid enters the channels through the conduit 214 and exits at opening 212. Heat is extracted from the first absorbing glass plate 210 using the circulating fluid. The circulating fluid also extracts heat from the window 215. The laser beam continues into the second absorbing glass plate 208. Heat is extracted from the second absorbing glass plate 208 using the circulating fluid. It is understood that the laser beam can continue into additional absorbing glass plates such as glass plates 206 and 201, and if necessary, additional glass plates. Heat can be extracted from the additional absorbing glass plates using the circulating fluid.

FIG. 3 shows a cut away view of the housing 202 shown in FIG. 2. The system 200 incorporates a series of absorbing glass plates with water flowing between them. The laser beam enters the beam dump housing 202 through the window 215 which is held in place by a frame 217 and bracket 218 and sealed with an "o" ring 205. The first absorbing glass plate 210 is operatively connected to the housing using the frame 217 and bracket 218. A first heat sync in the form of a channel 211 for a circulating fluid adjacent first absorbing glass plate 210 is used to extract heat from the first absorbing glass plate 210. Additional absorbing glass plates 208, 206, and 203 are operatively connected to the housing 202. Additional heat syncs in the form of a channels 209, 207, and 204 for a circulating fluid adjacent additional absorbing glass plates are used to extract heat from the additional absorbing glass plates. It is understood that the laser beam can continue into additional absorbing glass plates connected to the housing 202 using additional frames and heat can be extracted from the additional absorbing glass plates using a circulating fluid in additional channels. The plates are arranged with the least absorbing plate at the input and the highest absorbing plate at the end.

The system 200 can be used as a power meter by the installation of two temperature probes as illustrated in FIG. 2. A temperature probe is located at section 213 near inlet 214 and a temperature probe is located at the outlet 212. The temperature probe 213 is placed in the inlet water channel and the temperature probe is placed in the outlet 212. A flow measuring device measures water flow. The differential water temperature combined with the flow rate is used to calculate the total laser energy deposited into the system 200, minus the Fresnel reflection of the input window 215 which can be coated with an anti-reflection coating to minimize reflected energy. The system 200 can also be incorporated into an output safety shutter to safely control laser output energy.

The plates are mounted in the housing 202 with a space between them to allow water to flow over the entire surface. These frames are stacked in the housing 202, which incorporates a window at the input to allow the laser energy to enter the device. The window is attached using a frame that screws on and compresses an o-ring 205 against the frame to seal the device. The plates are arranged with the least absorbing plate at the input and the highest absorbing plate at the end. Water enters the housing 202 at the rear, near the bottom, and flows towards the front through channels cut into the frames. It is then directed up between the glass plates and out matching channels at the top of the housing. The flow direction, from bottom to top, eliminates trapped air that can cause uneven thermal loading and fracture the glass. The housing can be made any length to accommodate any number of glass plates for scaling of energy. Scaling of beam size is only limited by the availability of the glass required for a given laser wavelength. The Fresnel reflected light from the front surface is absorbed by tilting the dump at a small angle and imparting the light on a second piece of absorbing glass. This system can be incorporated into an output safety shutter to safely control laser output energy. The Fresnel reflected light from the front surface is absorbed by tilting the dump at a small angle and imparting the light on a second piece of absorbing glass.

Figure 4:
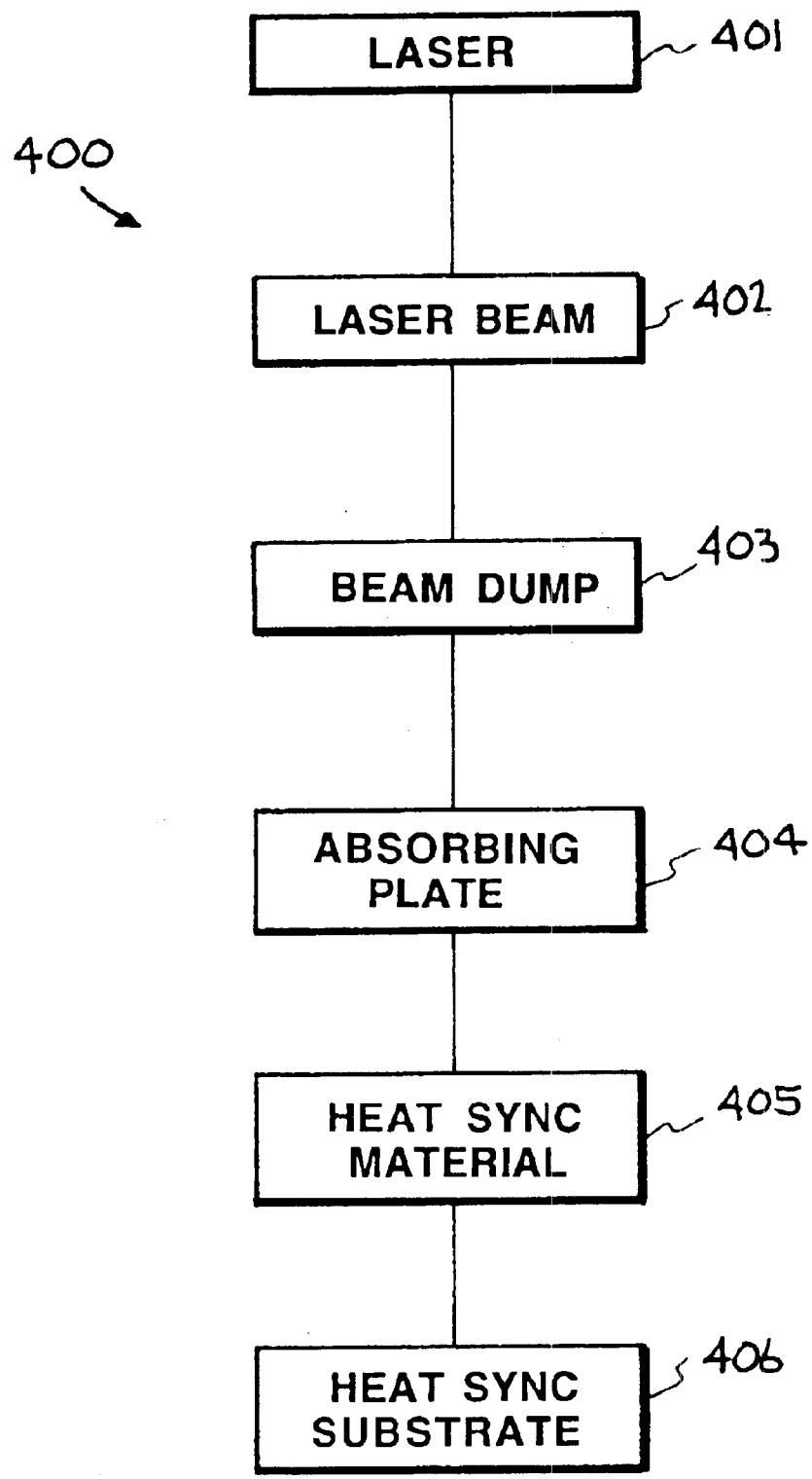
FIG. 4 illustrates yet another embodiment of a laser beam dump system constructed in accordance with the present invention.
Figure 5:
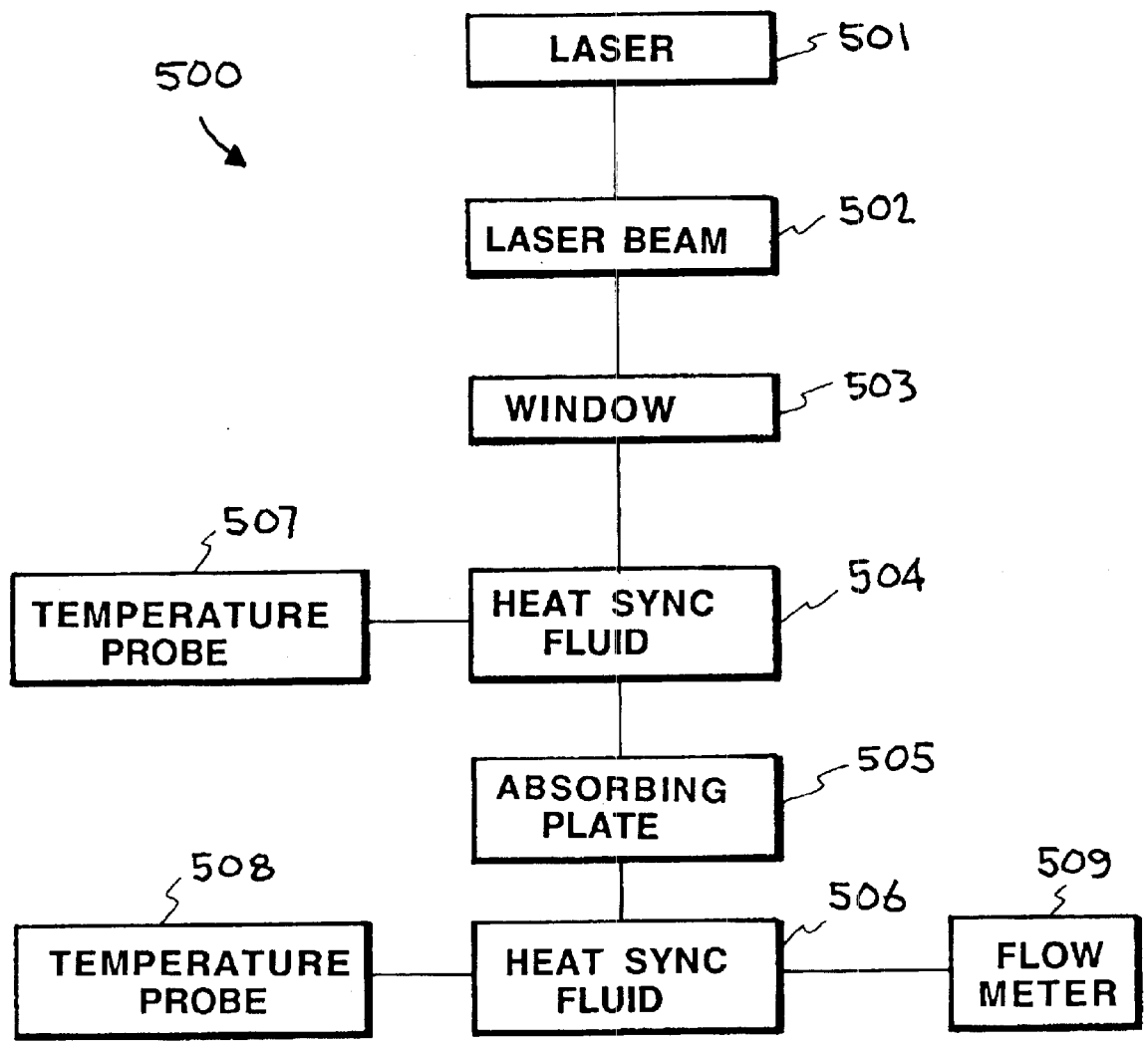
FIG. 5 illustrates another embodiment of a system constructed in accordance with the present invention.

Referring now to FIG. 4, another embodiment of a laser beam dump system constructed in accordance with the present invention is illustrated. This embodiment of a laser beam dump system is designated generally by the reference numeral 400. The system 400 incorporates a single absorbing glass plate with a heat sync substrate in the form of a copper or aluminum plate with a heat sync material or compound between them. A laser 401 produces laser beam 402. The laser beam 402 is directed into a beam dump 403. The beam dump 403 utilizes an absorbing glass plate 404.

The beam dump 403 comprises a heat sync substrate 406 for supporting the glass plate. The first absorbing glass plate 404 is operatively connected to the heat sync substrate 406. A first heat sync material 405 in the form of a heat sync material or compound is used to extract heat from the first absorbing glass plate 404. The extracted heat is transferred to the heat sync substrate 406 through the heat sync material or compound 405. The transferred heat is then dissipated by means of convection through fins machined in the heat sync substrate 406.

The system illustrated in FIG. 4 provides a method of controlling a laser beam. The laser 401 produces laser beam 402. The laser beam 402 is directed into the beam dump 403 and single absorbing glass plate 404. Heat is extracted from the first absorbing glass plate 404 using the heat sync material 405. The extracted heat is transferred to the heat sync substrate 406 and dissipated through fins machined into the heat sync substrate 406.

Because the laser pulse is absorbed gradually by the glass over its thickness; the energy density at any one point is below the threshold for plasma generation. The laser light is converted to heat which is removed gradually through the heat sync material. The Fresnel reflected light from the front surface is absorbed by tilting the glass plates at a small angle and imparting the light on a piece of absorbing glass. The system 400 can be incorporated into an output safety shutter to safely control laser output energy.

Another embodiment of a system constructed in accordance with the present invention. This embodiment is designated generally by the reference numeral 500. The system 500 is used for high power continuous wave or high rep-rate lasers.

The system 500 includes a housing containing a window 503, and single plate 505 made of an absorbing material. In one embodiment the absorbing material is copper. In another embodiment the absorbing material is ceramic. In another embodiment the absorbing material is another absorbing material such as aluminum.

A laser 501 produces a laser beam 502. The laser beam 502 enters the system 500 through the window 503 and hits the absorbing plate 505 with a heat sync fluid 504 and 506 flowing on both sides of the absorbing plate 505. In one embodiment the heat sync fluid 504 and 506 is water.

The system 500 provides a power meter using the two temperature probes 507 and 508. The temperature probe 508 is placed in the inlet water channel and the temperature probe 507 is placed in the outlet. A flow measuring device 509 measures water flow. The differential water temperature combined with the flow rate is used to calculate the total laser energy deposited into the system 500.

Existing power meters rely on conduction of the thermal energy from an absorbing surface through a substrate material which is cooled on the other side by a fluid. The incident surface can reach temperatures high enough to cause radiant energy loss which is not included in the power measurement. The advantage of the system 500 is the incident surface is cooled by the heat sync fluid 504 and 506 which prevents radiant energy loss hence all the thermal energy is transferred to the water. The accuracy of the device is increased because the radiant energy loss is nonlinear with both incident energy and laser beam area.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A laser beam dump for controlling a laser beam wherein heat is contained in said laser beam, comprising:

a housing, a first absorbing glass plate connected to said housing for absorbing at least a portion of said heat when contacted by said laser beam, at least one additional absorbing glass plate connected to said housing and positioned behind said first absorbing glass plate for absorbing at least a portion of said heat when contacted by said laser beam, and heat sync means for extracting heat from said absorbing glass plates, said heat sync means connected to said housing and positioned between and connected to said first absorbing glass plate and said a least one additional absorbing glass plate.

2. The laser beam dump of claim 1, wherein said heat sync means comprises a channel located between said at least one additional absorbing glass plate and a heat sync material in said channel.

3. The laser beam dump of claim 2, wherein said heat sync material is a fluid.

4. The laser beam dump of claim 2, wherein said heat sync material is water.

5. The laser beam dump of claim 2, wherein said heat sync material is circulating water.

6. The laser beam dump of claim 2, wherein said heat sync material is a gas.

7. The laser beam dump of claim 2, wherein said heat sync material is air.

8. The laser beam dump of claim 2, wherein said at least one additional absorbing glass plate is located at an angle to said first absorbing glass plate.

9. The laser beam dump of claim 2, including a temperature probe in said channel.

10. The laser beam dump of claim 2, including a flow meter in said channel.

11. The laser beam dump of claim 2, wherein said heat sync material comprises a copper plate.

12. The laser beam dump of claim 2, wherein said heat sync material comprises an aluminum plate.

13. The laser beam dump of claim 2, wherein said heat sync material comprises a ceramic.

14. A method of controlling a laser beam, comprising the steps of:

directing said laser beam into a first absorbing glass plate, directing said laser beam into a second absorbing glass plate positioned behind said first absorbing glass plate, and extracting heat from a heat sync material located in a channel between said first absorbing glass plate and said second absorbing glass plate.

15. The method of controlling a laser beam of claim 14, wherein said step of extracting heat comprises extracting heat from said first absorbing glass plate and extracting heat from said second absorbing glass plate through said heat sync material.

16. The method of controlling a laser beam of claim 15, wherein said step of extracting heat from said heat sync material is accomplished using a fluid.

17. The method of controlling a laser beam of claim 15, wherein said step of extracting heat from said heat sync material is accomplished using a circulating fluid.

18. The method of controlling a laser beam of claim 15, wherein said step of extracting heat from heat sync material is accomplished using water.

19. The method of controlling a laser beam of claim 15, wherein said step of extracting heat from said heat sync material is accomplished using circulating water.

20. The method of controlling a laser beam of claim 15, wherein said step of extracting heat from said heat sync material is accomplished using a gas.

21. The method of controlling a laser beam of claim 15, wherein said step of extracting heat from said heat sync material is accomplished using an air.

22. The method of controlling a laser beam of claim 15, wherein said second absorbing glass plate is positioned at an angle to said first absorbing glass plate to deflect Fresnel reflected light.

23. The method of controlling a laser beam of claim 15, wherein said step of directing said laser beam into said second absorbing plate is the input and said step of directing said laser beam into said first absorbing glass plate is the end, and wherein said first absorbing glass plate and said second absorbing glass plate are arranged with the highest absorbing glass plate at the end and the least absorbing glass plate at the input.

24. The method of controlling a laser beam of claim 17, including the steps of measuring the temperature of said circulating fluid and measuring the flow rate of said circulating fluid, and using the temperatures and flow rate to calculate the total laser energy deposited.

* * * * *